United States Patent
Park et al.

(10) Patent No.: US 11,603,937 B2
(45) Date of Patent: Mar. 14, 2023

(54) ANTI-ROTATION FLUID INJECTION DART

(71) Applicants: Do Seo Park, Houston, TX (US); Zhi Yong He, Cypress, TX (US)

(72) Inventors: Do Seo Park, Houston, TX (US); Zhi Yong He, Cypress, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 234 days.

(21) Appl. No.: 16/806,225

(22) Filed: Mar. 2, 2020

(65) Prior Publication Data

US 2020/0292083 A1 Sep. 17, 2020

Related U.S. Application Data

(60) Provisional application No. 62/817,764, filed on Mar. 13, 2019.

(51) Int. Cl.
*F16K 1/50* (2006.01)
*E21B 34/08* (2006.01)

(52) U.S. Cl.
CPC ............... *F16K 1/50* (2013.01); *E21B 34/08* (2013.01)

(58) Field of Classification Search
CPC ........... F16L 29/02; F16L 37/38; F16L 37/40; F16L 37/44; F16K 15/18; F16K 15/182; F16K 15/184; F16K 15/02; F16K 15/021; F16K 15/025; F16K 15/06; F16K 15/063; F16K 15/067; F16K 1/50; E21B 34/08
See application file for complete search history.

(56) References Cited

U.S. PATENT DOCUMENTS

| | | | | |
|---|---|---|---|---|
| RE23,272 E | * | 9/1950 | Hobbs | F16K 15/06 220/240 |
| 3,092,139 A | * | 6/1963 | Rodgers | F16K 15/06 251/332 |
| 4,257,443 A | * | 3/1981 | Turney | F16K 15/063 137/454.2 |
| 4,768,594 A | * | 9/1988 | Akkerman | E21B 34/08 166/65.1 |
| 5,176,171 A | * | 1/1993 | Andersson | F16K 1/44 137/512.1 |
| 2004/0000342 A1 | * | 1/2004 | Takahashi | F16K 15/026 137/538 |

FOREIGN PATENT DOCUMENTS

GB 995238 A * 6/1965

* cited by examiner

*Primary Examiner* — Hailey K. Do
(74) *Attorney, Agent, or Firm* — Cantor Colburn LLP

(57) ABSTRACT

An injection valve for introducing fluids into a subsurface environment includes a valve housing including a conduit having an inlet and an outlet. A valve seat is arranged in the valve housing. An anti-rotation dart is arranged in the valve housing adjacent the valve seat. The anti-rotation dart includes a valve element that is selectively engageable with the valve seat. An anti-rotation feature is provided on at least one of the valve seat and the anti-rotation dart. The anti-rotation feature constrains rotation of the anti-rotation dart relative to the valve seat.

8 Claims, 8 Drawing Sheets

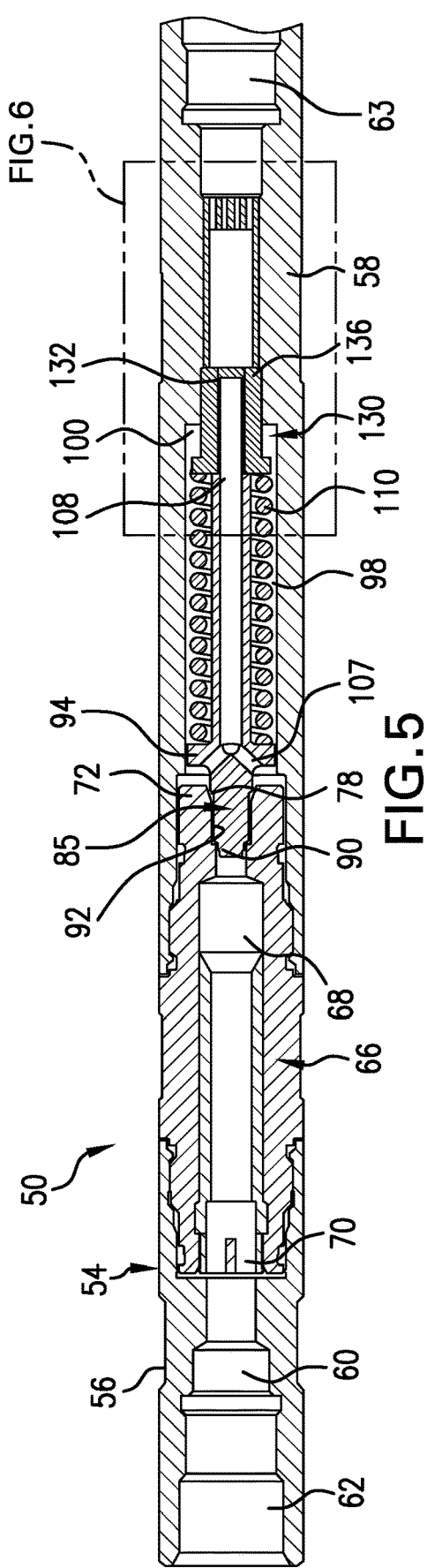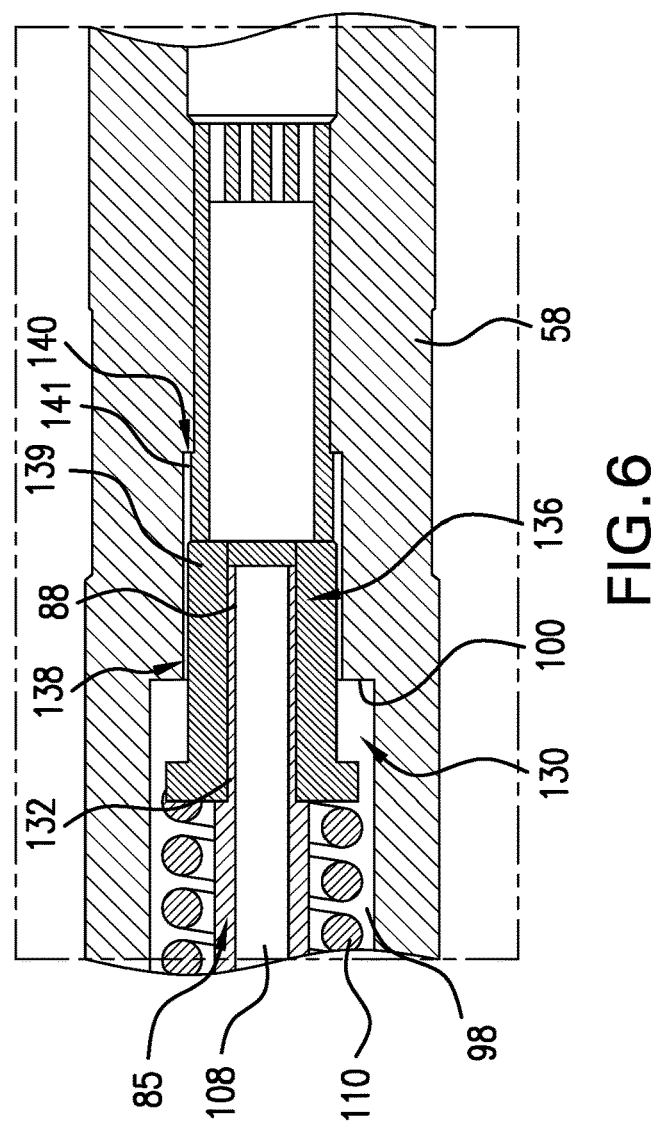

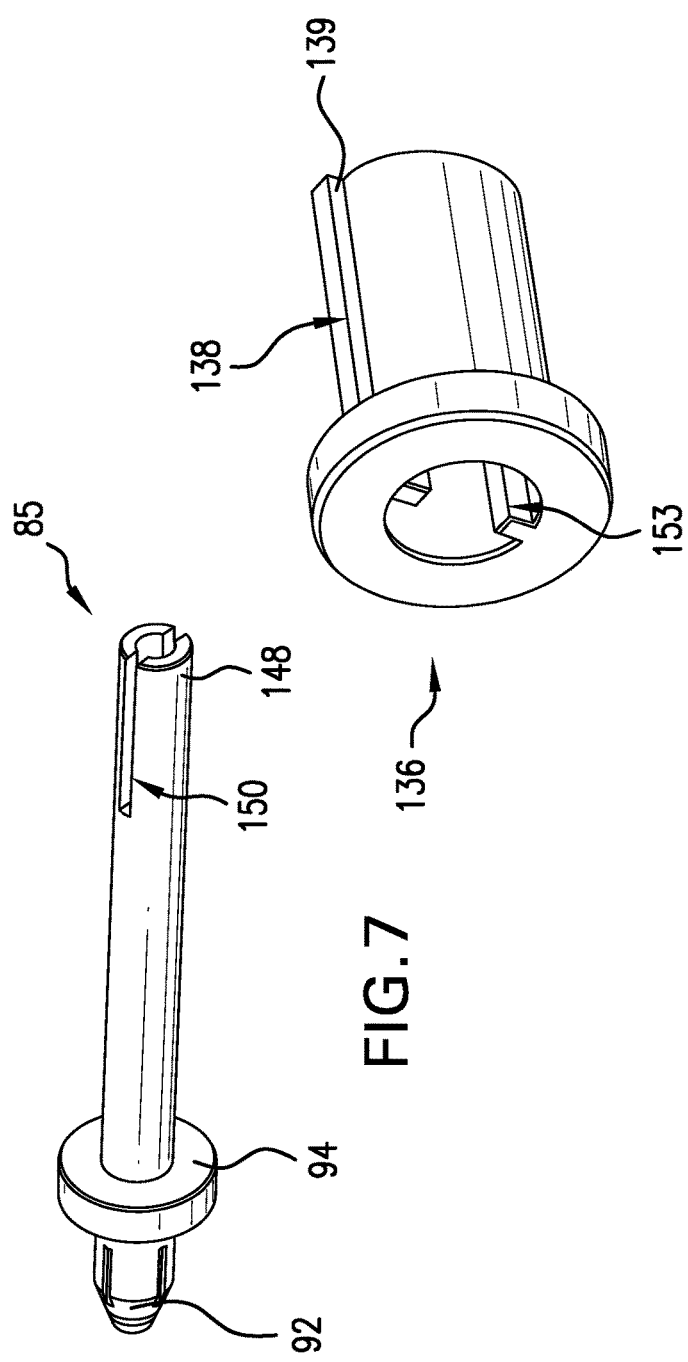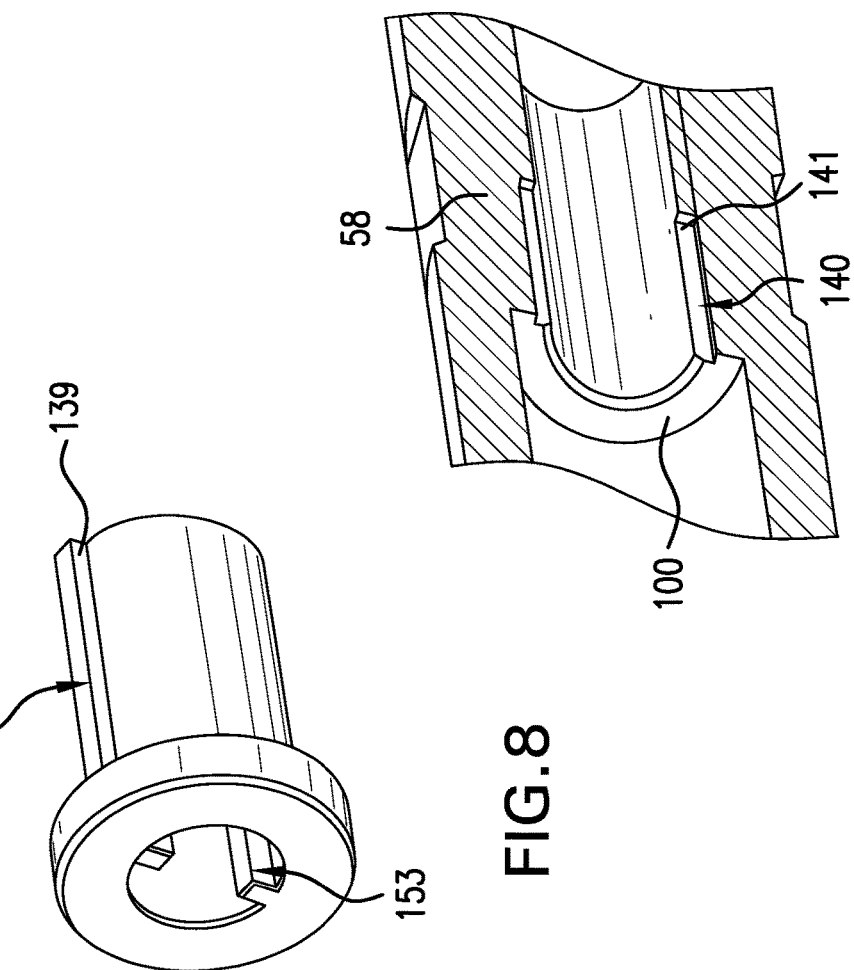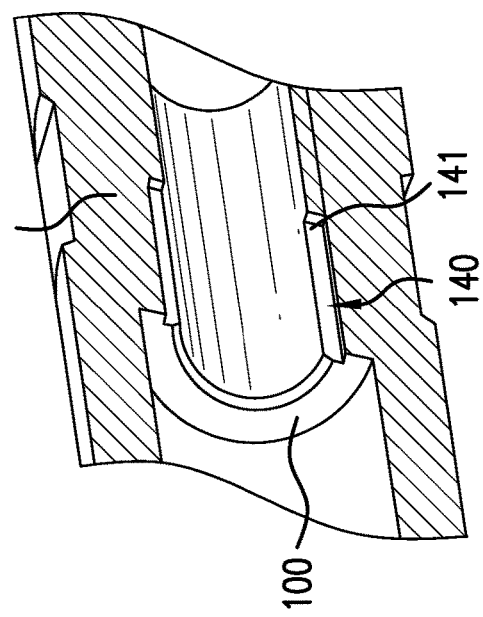

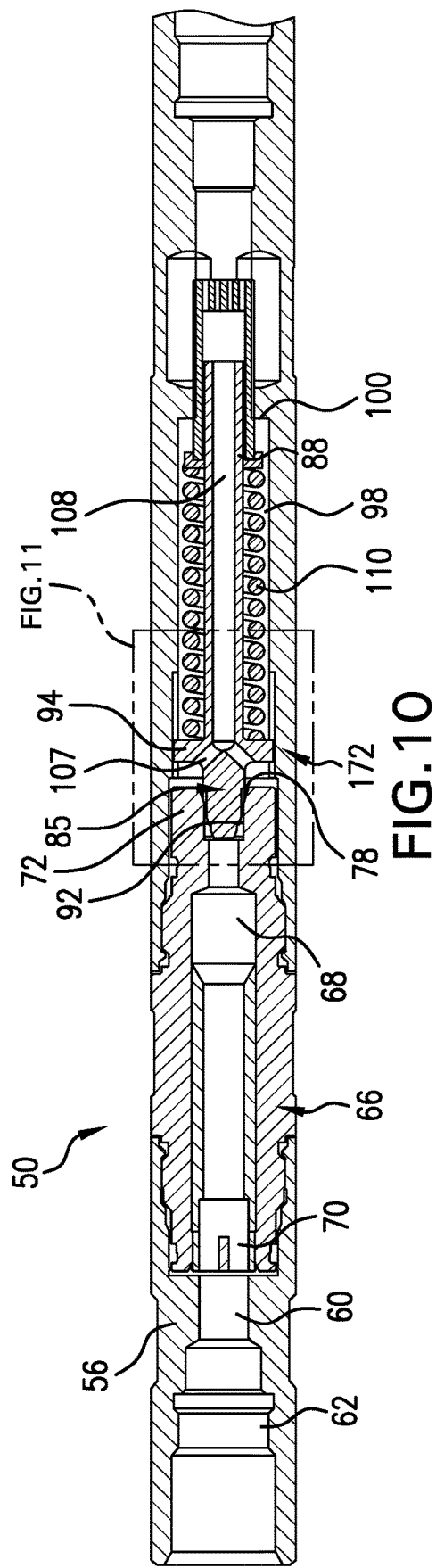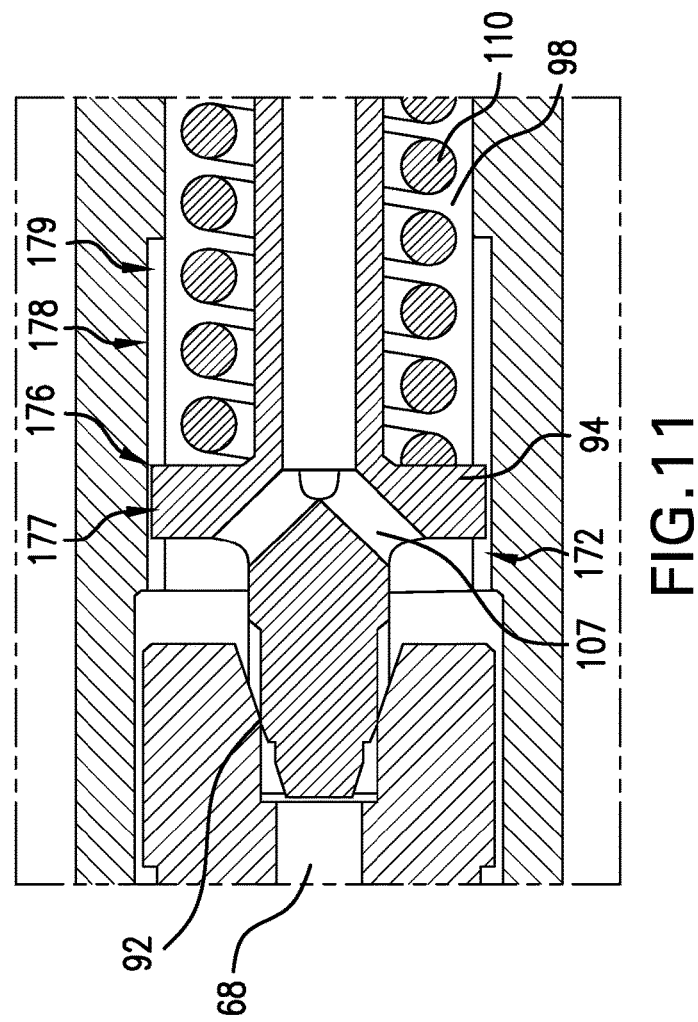

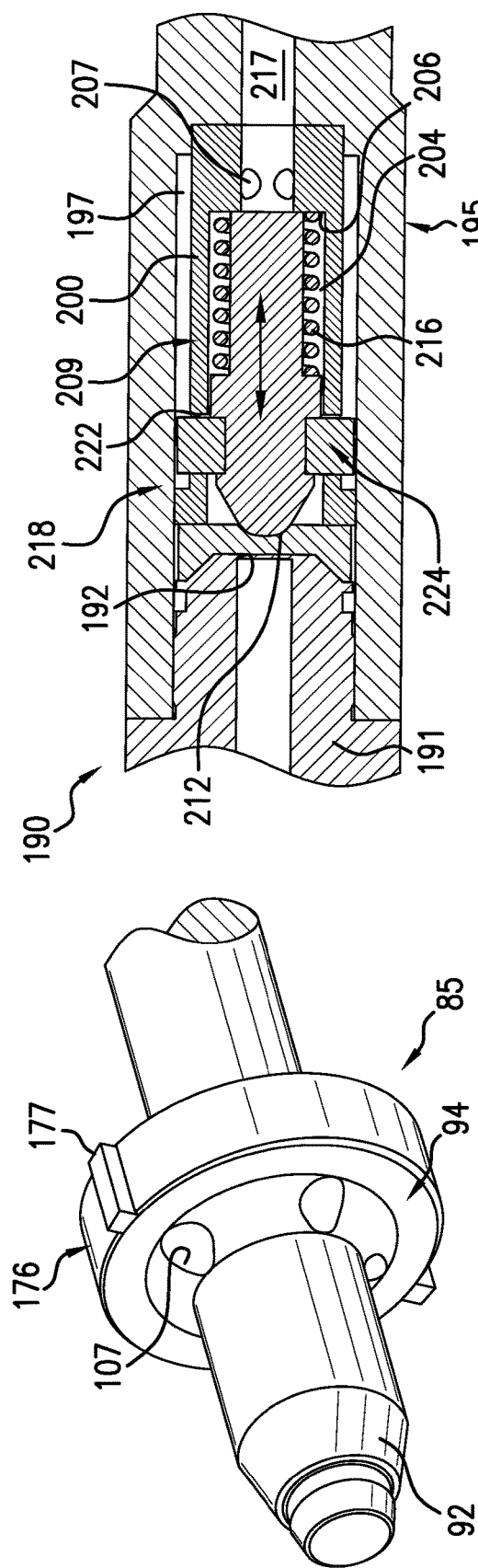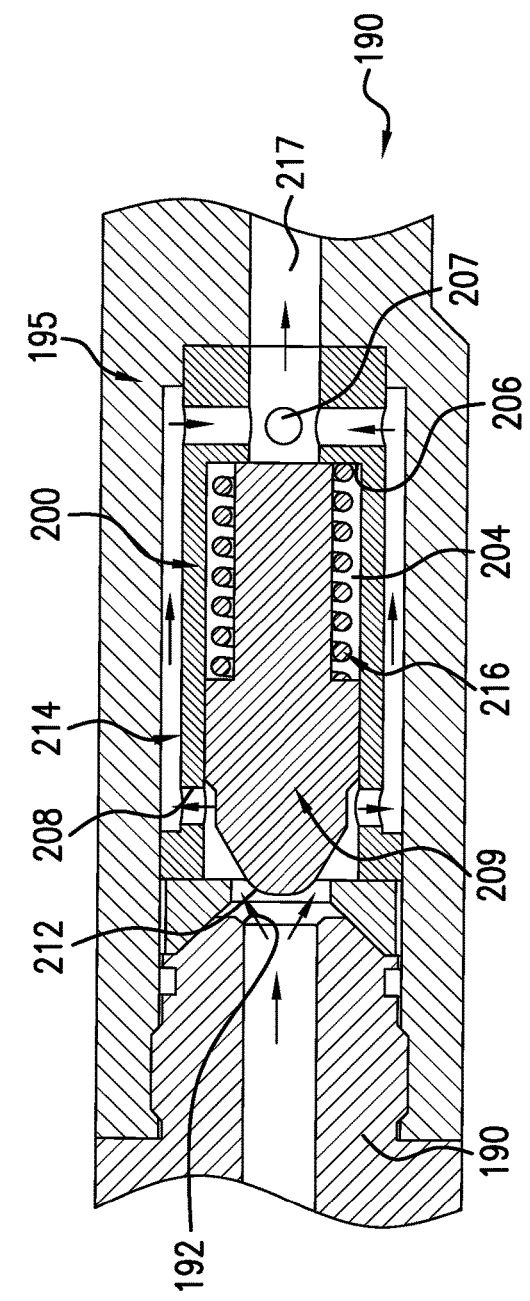
FIG. 12
FIG. 13
FIG. 14

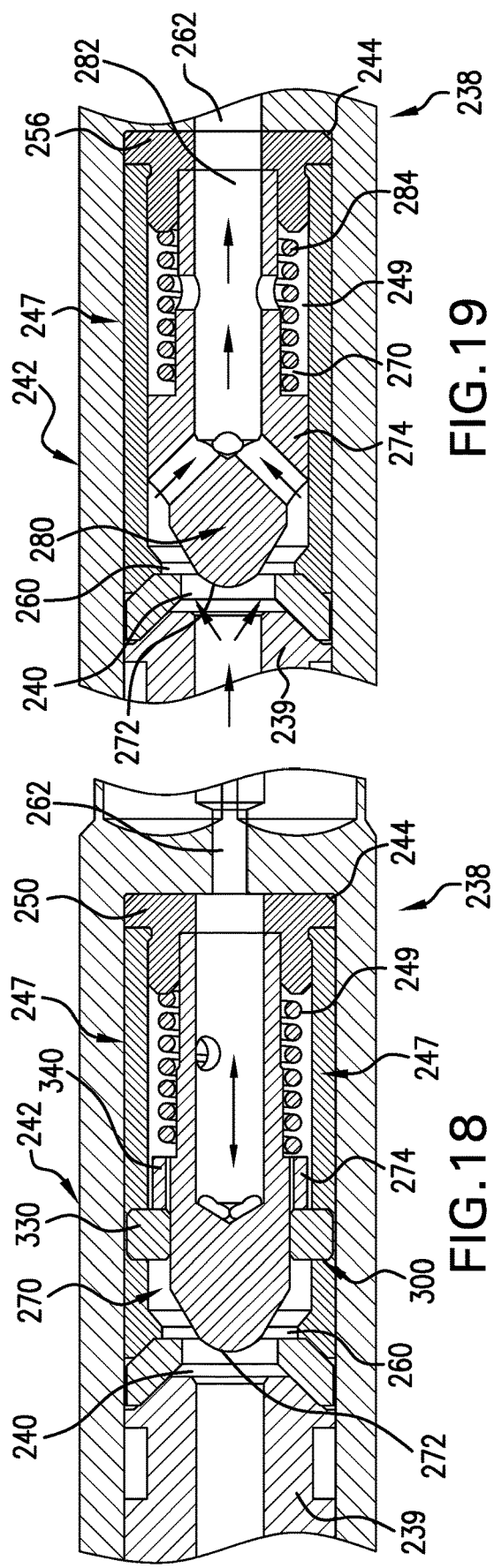

ANTI-ROTATION FLUID INJECTION DART

CROSS REFERENCE TO RELATED APPLICATION

This application claims the benefit of an earlier filing date from U.S. Provisional Application Ser. No. 62/817,764 filed Mar. 13, 2019, the entire disclosure of which is incorporated herein by reference.

BACKGROUND

In the resource exploration and recovery industry, boreholes are formed in a resource bearing formation for the purpose testing for and/or extracting formation fluids such as oil and natural gas. Generally, a tubular string is guided into the borehole toward a potential resource bearing zone. During exploration and/or production cycles, it may be desirable to inject a fluid into the formation. For example, a fluid may be injected into a resource bearing zone to promote production and or fluid release.

Fluid injection may be controlled by an injection dart. For example, the injection dart may be configured to release an amount of fluid when fluid pressure reaches a predetermined level. The injection dart may include a valve that is biased in a closed configuration. Fluid pressure may be raised to an activation pressure that overcomes a biasing pressure holding the valve closed. The biasing pressure may be provided by a compression spring arranged in the injection dart. When compressed, the compression spring may case a rotation of the valve. That is, spring geometry may cause a rotational force to be imparted upon the valve upon each activation and/or deactivation.

Over time, the rotational force may lead to valve seat wear. Wear at the valve seat may reduce sealing capacity and may also create an undesirable fluid path that could allow fluid to pass through the valve without applying the activation pressure. Fluid leaks may require removal and replacement of the injection dart, or abandoning of a particular resource bearing zone for a period of time. Replacement of an injection dart and temporary abandonment of a resource bearing zone is costly. Accordingly, the art would appreciate an injection dart that is more robust, e.g., less prone to wear resulting from dart rotation.

SUMMARY

Disclosed is an injection valve for introducing fluids into a subsurface environment, the injection valve including a valve housing including a conduit having an inlet and an outlet. A valve seat is arranged in the valve housing. An anti-rotation dart is arranged in the valve housing adjacent the valve seat. The anti-rotation dart includes a valve element that is selectively engageable with the valve seat. An anti-rotation feature is provided on at least one of the valve seat and the anti-rotation dart. The anti-rotation feature constrains rotation of the anti-rotation dart relative to the valve seat.

BRIEF DESCRIPTION OF THE DRAWINGS

The following descriptions should not be considered limiting in any way. With reference to the accompanying drawings, like elements are numbered alike:

FIG. 5 depicts a cross-sectional side view of a fluid injector valve including an anti-rotation dart, in accordance with another aspect of an exemplary embodiment;

FIG. 6 depicts a cross-sectional side view of a sleeve member mounted to the anti-rotation dart of FIG. 5, in accordance with an exemplary aspect;

FIG. 7 depicts a perspective view of the anti-rotation dart in the fluid injector valve of FIG. 5, in accordance with an exemplary embodiment;

FIG. 8 depicts a perspective view of the sleeve member of fluid injection valve of FIG. 5, in accordance with an exemplary embodiment;

FIG. 9 depicts a perspective view of a lower valve housing portion of the fluid injector valve of FIG. 5, in accordance with an exemplary embodiment;

FIG. 10 depicts a cross-sectional side view of a fluid injector valve in accordance with yet another aspect of an exemplary embodiment;

FIG. 11 depicts a cross-sectional side view of a portion of a valve seat and anti-rotation dart in the fluid injector valve of FIG. 10, in accordance with an exemplary aspect;

FIG. 12 depicts a perspective view of an end portion of a valve seat end of the anti-rotation dart in the fluid injector valve of FIG. 10, in accordance with an exemplary aspect;

FIG. 13 depicts a cross-sectional side view of a fluid injector valve including an anti-rotation dart, in accordance with still yet another aspect of an exemplary embodiment;

FIG. 14 depicts a cross-sectional side view of the fluid injector valve of FIG. 13 rotated 90 degrees, in accordance with an exemplary aspect;

FIG. 18 depicts a cross-sectional side view of a fluid injector valve, in accordance with yet still another aspect of an exemplary embodiment;

FIG. 19 depicts a cross-sectional side view of the fluid injector valve of FIG. 18 rotated 90 degrees, in accordance with an exemplary aspect;

FIG. 20 depicts a perspective view of a valve support of the fluid injector valve of FIG. 18, in accordance with an exemplary aspect;

FIG. 21 depicts a perspective view of an anti-rotation dart of the fluid injector valve of FIG. 18, in accordance with an exemplary aspect; and FIG. 22 depicts a perspective view of an anti-rotation feature of the fluid injector valve of FIG. 18, in accordance with an exemplary aspect.

DETAILED DESCRIPTION

A detailed description of one or more embodiments of the disclosed apparatus and method are presented herein by way of exemplification and not limitation with reference to the Figures.

Figure 1:
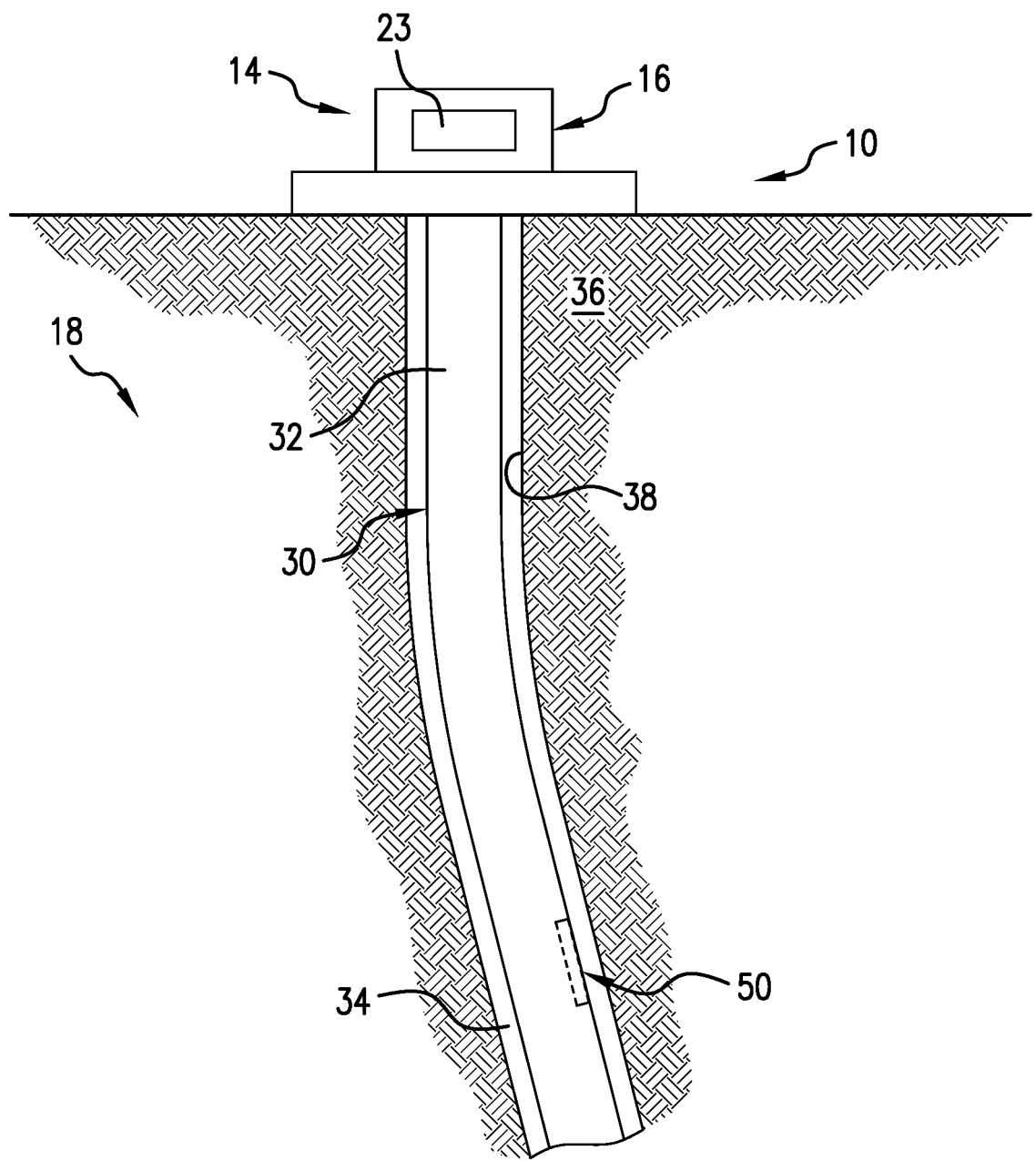
FIG. 1 depicts a resource exploration and recovery system including a fluid injector valve, in accordance with an exemplary embodiment.

A resource exploration and recovery system, in accordance with an exemplary embodiment, is indicated generally at 10, in FIG. 1. Resource exploration and recovery system 10 should be understood to include well drilling operations, resource extraction and recovery, $CO_2$ sequestration, and the like. Resource exploration and recovery system 10 may include a first system 14 which, in some environments, may take the form of a surface system 16 operatively and fluidically connected to a second system 18 which, in some environments, may take the form of a subsurface system. First system 14 may include a control system 23 that may provide power to, monitor, communicate with, and/or activate one or more downhole operations as will be discussed herein. Surface system 16 may include additional systems such as pumps, fluid storage systems, cranes and the like (not shown).

Second system 18 may include a tubular string 30, formed from one or more tubulars 32, which extends into a wellbore 34 formed in formation 36. Wellbore 34 includes an annular wall 38 which may be defined by a surface of formation 36. In an embodiment, tubular string 30 supports an injection valve 50 that may be used to introduce fluids, such as various chemicals, into wellbore 36 to promote fluid production.

Figure 2:
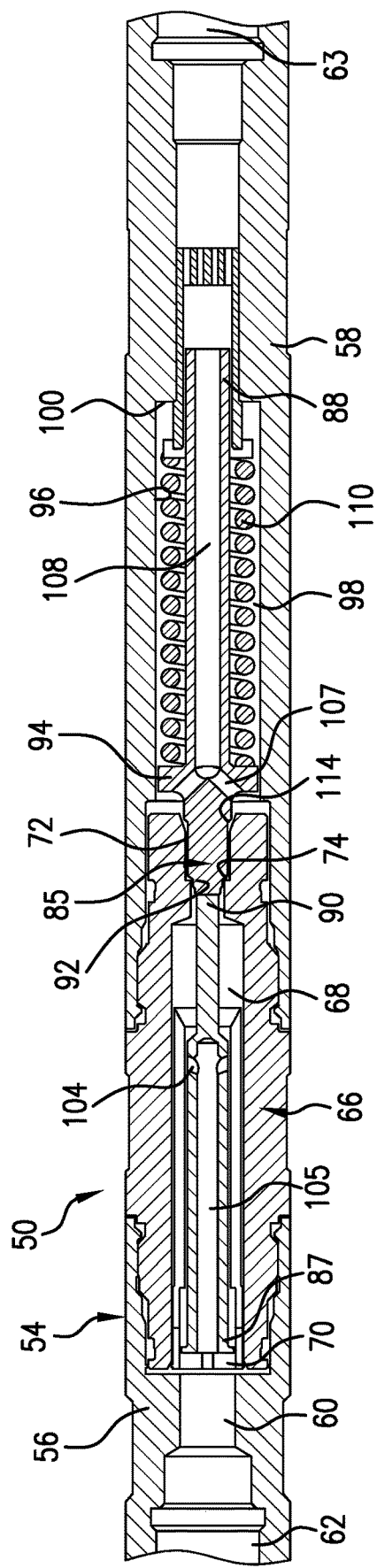
FIG. 2 depicts a cross-sectional side view of a fluid injector valve including an anti-rotation dart, in accordance with an aspect of an exemplary embodiment.
Figure 4:
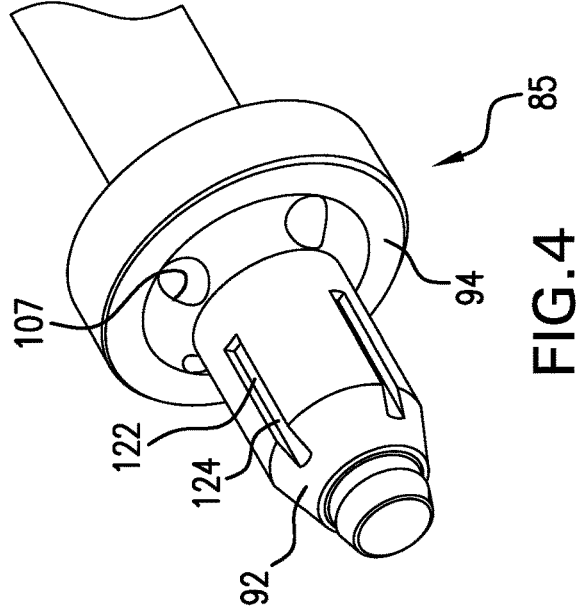
FIG. 4 depicts perspective view of an end portion of the anti-rotation dart of the fluid injector valve of FIG. 2, in accordance with an exemplary aspect.
Figure 3:
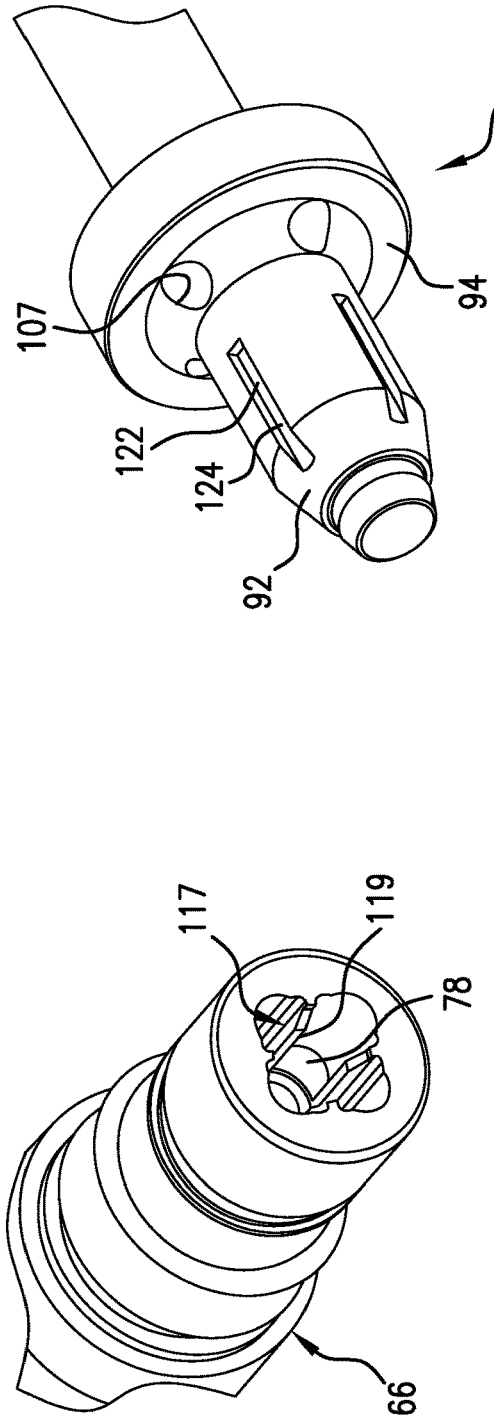
FIG. 3 depicts a perspective view of an end portion of a valve seat of the fluid injector valve of FIG. 2, in accordance with an exemplary aspect.

Referring to FIGS. 2-4, injection valve 50 includes a valve housing 54 including a first body portion 56 and a second body portion 58. A conduit 60 extends through first body portion 56 and second body portion 58. Conduit 60 includes an inlet 62 at first body portion 56 and an outlet 63 at second body portion 58. A valve seat member 66 may be interposed between and connected with first and second body portions 56 and 58. Valve seat member 66 includes a chamber 68 having an inlet portion 70 fluidically exposed to inlet 62 and an outlet portion 72 fluidically exposed to outlet 63. Valve seat member 66 includes an angled surface portion (not separately labeled) at outlet portion 72 that defines a valve seat 78.

In accordance with an exemplary aspect, an anti-rotation dart 85 extends through chamber 68, outlet portion 72 and into second body portion 58. Anti-rotation dart 85 includes a first end 87 that is disposed in chamber 68, a second end 88 that is disposed in second body portion 58 and an intermediate portion 90 having a valve surface 92 that selectively engages valve seat 78. A guide member 94 projects radially outwardly of intermediate portion 90 toward an inner surface 66 of conduit 60 in second body portion 58. Guide member 94 promotes maintaining an alignment between valve surface 92 and valve seat 78.

In an embodiment, a section of conduit 60 in second body portion 58 defines a valve housing portion 98 having an end wall 100. Guide member 94 is arranged in valve housing portion 98. In an exemplary aspect, guide member 94 may support one or more openings 107 that lead to a conduit 108 extending through second end 88 of anti-rotation dart 85. A spring 110 is arranged between end wall 100 and guide member 94. Spring 110 biases valve surface 92 onto valve seat 78. With this arrangement, fluid to pass through inlet 62, into inlet portion 70. When fluid pressure reaches a selected level, overcoming a force applied by spring 110, valve surface 92 may be unseated from valve seat 78. The fluid may then pass from outlet portion 72, through openings 107 into conduit 108 and subsequently flow from outlet 63.

In an embodiment, an anti-rotation feature 114 prevents or constrains rotation of anti-rotation dart 85 relative to valve seat member 66 that may be caused by a compression and release of spring 110. In an embodiment, anti-rotation feature 114 may include a first anti-rotation element 117 that may take the form of a projection 119 that extends radially inwardly from outlet portion 72 as shown in FIG. 3. Anti-rotation feature 114 may also include a second anti-rotation element 122 that may take the form of a groove 124 formed in first end 87 of anti-rotation dart 85. At this point, it should be understood that the number and relative position of projections and grooves may vary. That is, it should be understood that the projection could be formed on anti-rotation dart 85 and the groove formed on valve seat member 66 or second body portion 58.

Reference will now follow to FIGS. 5 and 6, wherein like reference numbers represent corresponding parts in the respective views, in describing an anti-rotation feature 128 for anti-rotation dart 85 in accordance with another aspect of an exemplary embodiment. In the exemplary aspect shown, second end 88 of anti-rotation dart 85 includes a reduced diameter portion 132 that is received by a valve support 136. Valve support 136 may be press-fit onto reduced diameter portion 132. Valve support 136 supports and promotes axial alignment/centering of anti-rotation dart 85. Anti-rotation feature 128 include a first anti rotation element 138 which could take the form of a projection or key 139 provided on valve support 136 and a second anti-rotation element 140 which could take the form of a groove 141 formed in second body portion 58.

FIG. 7 depicts an outlet end 148 of anti-rotation dart 85 in accordance with another exemplary aspect. Outlet end 148 includes a groove or slot 150 that receives a radially inwardly directed projection 153 on valve support 136 shown in FIG. 8. In this manner, first and second anti-rotation elements 138 and 140 constrain rotation of valve support 136 relative to second body portion 58 as shown in FIG. 9, while slot 150 and radially inwardly directed projection 153 constrain rotation of anti-rotation dart 85 relative to valve support 136. Thus, in an exemplary embodiment, injection valve assembly 50 may include more than one anti-rotation feature.

Reference will now follow to FIGS. 10-12 wherein like reference numbers represent corresponding parts in the respective views, in describing an anti-rotation feature 172 in accordance with another exemplary aspect. Anti-rotation feature 172 includes a first anti-rotation element 176 that may take the form of a projection of key 177 extending radially outwardly of guide member 94 and a second anti-rotation feature 178 that may take the form of a groove 179 formed on an inner surface (not separately labeled) of second body portion 58. In a manner similar to that discussed herein, first and second anti-rotation elements 176 and 178 constrain relative rotation of anti-rotation dart 86 and valve seat member 66. In a manner also similar to that discussed herein, the number, relative position, and location of first and second anti-rotation elements 176 and 178 may vary.

Reference will now follow to FIGS. 13-17 in describing an injection valve assembly 190 in accordance with another exemplary aspect. Injection valve assembly 190 includes a valve seat member 191 having a valve seat 192. Valve seat member 191 is connected to a valve body 195 having a conduit 197. A valve support 200 is arranged in conduit 197. Valve support 200 may be press-fit into valve body 195 in conduit 197 and includes an interior portion or chamber 204 having an end wall 206 that supports a plurality of fluid inlet openings 207. Valve support 200 also includes a plurality of fluid outlet openings 208. An anti-rotation dart 209 is arranged in chamber 204. Anti-rotation dart 209 includes a valve surface 212 that selectively engages with valve seat 192 and a guide member 214 that projects radially outwardly toward an inner surface (not separately labeled) of chamber 204.

A spring 216 biases valve surface 212 onto valve seat 192. Fluid pressure may be applied to anti-rotation dart 209 overcoming a pressure applied by spring 216 thereby unseating valve surface 212 from valve seat 192. Fluid may pass over valve surface 212 and exit valve support 200 through fluid outlet openings 208. The fluid may pass through a passage that exists between an inner surface (not separately labeled) of conduit 197 and an outer surface (also not separately labeled) of valve support 200. The fluid may pass back into valve support 200 through inlet openings 207 and then flow through an outlet 217 of valve body 195.

Figures 15, 16, 17:
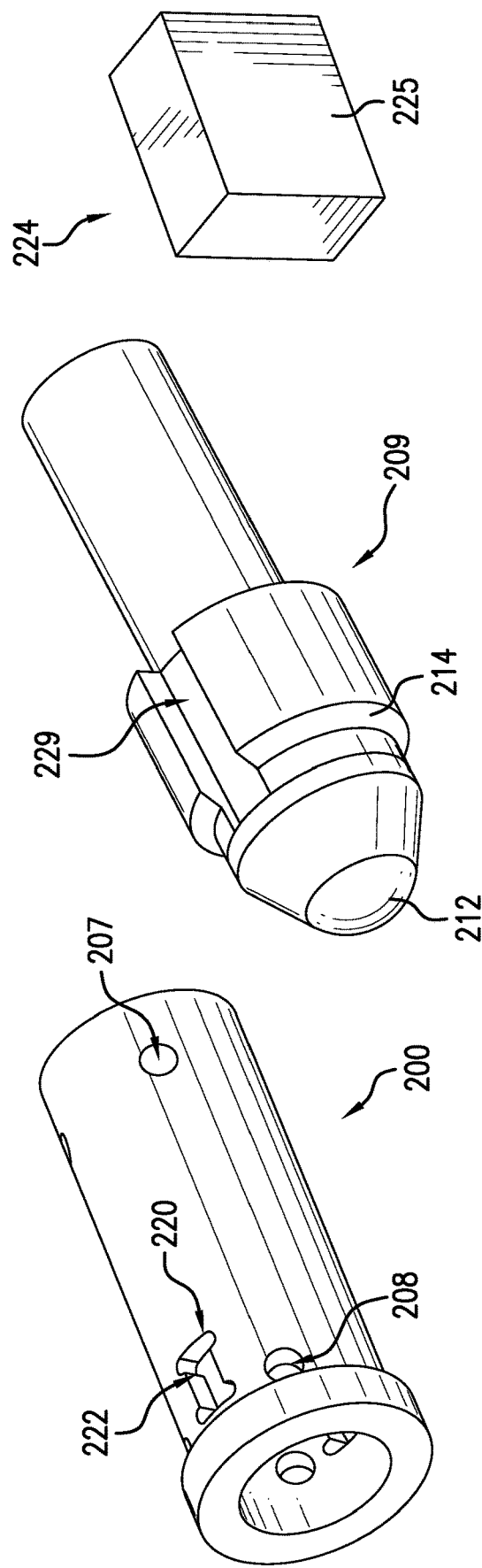
FIG. 15 depicts a perspective view of a valve support of the fluid injector valve of FIG. 13, in accordance with an exemplary aspect.
FIG. 16 depicts a perspective view of an anti-rotation dart of the fluid injector valve of FIG. 13. in accordance with an exemplary aspect.
FIG. 17 depicts a perspective view of an anti-rotation feature of the fluid injector valve of FIG. 13, in accordance with an exemplary aspect.

In an embodiment, injection valve assembly 190 includes an anti-rotation feature 218 that constrains relative rotation of anti-rotation dart 209 and valve support 200. As shown in FIG. 15, anti-rotation feature 218 includes a first anti-rotation element 220 that may take the form of an opening 222 formed in valve support 200. Opening 222 is receptive of a second anti-rotation element 224 which may take the form of a key 225 (FIG. 17). A third anti-rotation element 227 may take the form of a groove 229 provided in guide member 214. With this arrangement, key 225 may extend through opening 222 into groove 229 and thereby constrain any relative rotation of anti-rotation dart 209 and valve support 200.

Reference will now follow to FIGS. 18-22 in describing an injection valve assembly 238 in accordance with yet another aspect of an exemplary embodiment. Injection valve assembly 238 includes a valve seat member 239 having a valve seat 240. Valve seat member 238 is connected to a valve body 242 having a conduit 244. A valve support 247 is arranged in conduit 244. Valve support 247 may be press-fit into valve body 242 in conduit 244 or constrained by valve seat member 239. Valve support 247 includes an interior portion or chamber 249 having an end wall defined by an end cap 250. Valve support 247 includes an inlet 260 at cave seat 240 and an outlet 262. An anti-rotation dart 270 is arranged in chamber 249. Anti-rotation dart 270 includes a valve surface 272 that selectively engages with valve seat 240 and a guide member 274 that projects radially outwardly toward an inner surface (not separately labeled) of chamber 249. A plurality of openings 280 extend into ant-rotation dart 270 to a central passage 282.

A spring 284 biases valve surface 272 onto valve seat 240. Fluid pressure may be applied to anti-rotation dart 270 overcoming a pressure applied by spring 284 thereby unseating valve surface 272 from valve seat 240. Fluid may pass into anti-rotation dart 270 through openings 280 and flow through central passage 282 toward outlet 262.

In an embodiment, injection valve assembly 238 includes an anti-rotation feature 300 that constrains relative rotation of anti-rotation dart 270 and valve support 247. As shown in FIG. 20, anti-rotation feature 300 includes a first anti-rotation element 314 that may take the form of an opening 324 formed in valve support 247. Opening 324 is receptive of a second anti-rotation element 330 which may take the form of a key 332 (FIG. 22). A third anti-rotation element 338 may take the form of a groove 340 provided in guide member 274. With this arrangement, key 332 may extend through opening 324 into groove 340 and thereby constrain any relative rotation of anti-rotation dart 270 and valve support 247.

Set forth below are some embodiments of the foregoing disclosure:

Embodiment 1. An injection valve for introducing fluids into a subsurface environment, the injection valve comprising: a valve housing including a conduit having an inlet and an outlet; a valve seat arranged in the valve housing; an anti-rotation dart arranged in the valve housing adjacent the valve seat, the anti-rotation dart including a valve element that is selectively engageable with the valve seat; and an anti-rotation feature provided on at least one of the valve seat and the anti-rotation dart, the anti-rotation feature constraining rotation of the anti-rotation dart relative to the valve seat.

Embodiment 2. The injection valve according to any prior embodiment, wherein the anti-rotation feature includes a first anti-rotation element provided on the valve seat and a second anti-rotation feature provided on the anti-rotation dart.

Embodiment 3. The injection valve according to any prior embodiment, wherein the first anti-rotation element defines a projection extending radially inwardly from the valve seat and the second anti-rotation feature defines a groove formed in the anti-rotation dart.

Embodiment 4. The injection valve assembly according to any prior embodiment, further comprising: a sleeve member arranged in the conduit, wherein the anti-rotation feature includes a first anti-rotation element provided on the sleeve member and a second anti-rotation element provided in the anti-rotation dart.

Embodiment 5. The injection valve assembly according to any prior embodiment, wherein the sleeve member is arranged between the valve seat and the outlet.

Embodiment 6. The injection valve assembly according to any prior embodiment, wherein the sleeve member is slidingly mounted relative to the valve housing, the sleeve member being rotationally locked relative to the valve housing.

Embodiment 7. The injection valve assembly according to any prior embodiment, wherein the anti-rotation dart includes a guide member, the anti-rotation feature including a first anti-rotation element provided on the guide member and a second anti-rotation element provided in the valve housing.

Embodiment 8. The injection valve assembly according to any prior embodiment, wherein the second anti-rotation element is arranged between the valve seat and the outlet.

Embodiment 9. The injection valve assembly according to any prior embodiment, wherein the first anti-rotation element comprises a key projecting radially outwardly of the guide member and the second anti-rotation element comprises a groove formed in the housing, the groove being receptive of the key.

Embodiment 10. The injection valve assembly according to any prior embodiment, further comprising: a valve support including a passage arranged in the valve housing, the anti-rotation dart extending through the passage.

Embodiment 11. The injection valve assembly according to any prior embodiment, wherein the anti-rotation feature includes a first anti-rotation element provided on the anti-rotation dart and a second anti-rotation element provided on the valve support.

Embodiment 12. The injection valve assembly according to any prior embodiment, wherein the first anti-rotation element defines a groove formed in the anti-rotation dart and the second anti-rotation feature comprises a key extending from the valve support into the groove.

Embodiment 13. The injection valve assembly according to any prior embodiment, wherein the valve support includes an opening, the key extending through the opening into the groove.

Embodiment 14. The injection valve assembly according to any prior embodiment, wherein the key includes a substantially circular cross-section.

Embodiment 15. The injection valve assembly according to any prior embodiment, wherein the key includes a substantially rectangular cross-section.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.)

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An injection valve for introducing fluids into a subsurface environment, the injection valve comprising:
   a valve housing including a conduit having an inlet and an outlet;
   a valve seat arranged in the valve housing;
   an anti-rotation dart arranged in the valve housing adjacent the valve seat, the anti-rotation dart including a conduit section having a first opening fluidically exposed to the inlet and a second opening fluidically exposed to the outlet and a valve surface that is selectively engageable with the valve seat, the first opening being radially outwardly spaced from the valve seat;
   an anti-rotation feature provided on at least one of the valve seat and the anti-rotation dart, the anti-rotation feature constraining rotation of the anti-rotation dart relative to the valve seat; and
   a sleeve member arranged in the conduit, wherein the anti-rotation feature includes a first anti-rotation element provided on the sleeve member and a second anti-rotation element provided in the anti-rotation dart.

2. The injection valve assembly according to claim 1, wherein the sleeve member is arranged between the valve seat and the outlet.

3. The injection valve assembly according to claim 1, wherein the sleeve member is slidingly mounted relative to the valve housing, the sleeve member being rotationally locked relative to the valve housing.

4. An injection valve for introducing fluids into a subsurface environment, the injection valve comprising:
   a valve housing including a conduit having an inlet and an outlet;
   a valve seat arranged in the valve housing;
   an anti-rotation dart arranged in the valve housing adjacent the valve seat, the anti-rotation dart including a conduit section having a first opening fluidically exposed to the inlet and a second opening fluidically exposed to the outlet and a valve surface that is selectively engageable with the valve seat, the first opening being radially outwardly spaced from the valve seat;
   an anti-rotation feature provided on at least one of the valve seat and the anti-rotation dart, the anti-rotation feature constraining rotation of the anti-rotation dart relative to the valve seat, wherein the anti-rotation feature includes a first anti-rotation element provided on the anti-rotation dart and a second anti-rotation element provided on the valve support; and
   a valve support including a passage arranged in the valve housing, the anti-rotation dart extending through the passage.

5. The injection valve assembly according to claim 4, wherein the first anti-rotation element defines a groove formed in the anti-rotation dart and the second anti-rotation feature comprises a key extending from the valve support into the groove.

6. The injection valve assembly according to claim 5, wherein the valve support includes an opening, the key extending through the opening into the groove.

7. The injection valve assembly according to claim 5, wherein the key includes a substantially circular cross-section.

8. The injection valve assembly according to claim 5, wherein the key includes a substantially rectangular cross-section.

* * * * *